(12) United States Patent
Kitano

(10) Patent No.: US 6,554,454 B1
(45) Date of Patent: Apr. 29, 2003

(54) FILTER, ILLUMINATION DEVICE AND ILLUMINATION METHOD

(75) Inventor: Hirohisa Kitano, Toyonaka (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/603,949

(22) Filed: Jun. 27, 2000

(30) Foreign Application Priority Data

Jun. 28, 1999 (JP) .......................................... 11-181094

(51) Int. Cl.[7] .................................................. F21V 9/00
(52) U.S. Cl. .................... 362/293; 362/280; 362/282; 362/317; 362/322; 362/324; 359/889; 359/890; 359/891; 359/892
(58) Field of Search ................................ 362/293, 583, 362/280, 282, 284, 322, 323, 324, 317, 311; 359/889, 885, 890, 891, 892; 355/35

(56) References Cited

U.S. PATENT DOCUMENTS

| | | | |
|---|---|---|---|
| 3,567,305 A | * 3/1971 | Collier et al. ................. 359/11 |
| 3,732,357 A | 5/1973 | Rushing et al. ........ 178/5.4 CF |
| 4,369,475 A | 1/1983 | Ho et al. ..................... 360/97 |
| 4,375,647 A | 3/1983 | Mir ............................. 358/75 |
| 4,392,187 A | * 7/1983 | Bornhorst ................... 362/233 |
| 4,786,947 A | 11/1988 | Kosugi et al. ................ 355/30 |
| 5,777,694 A | 7/1998 | Poradish ..................... 348/743 |
| 5,790,238 A | 8/1998 | Ishikawa et al. ............. 355/35 |

* cited by examiner

Primary Examiner—Sandra O'Shea
Assistant Examiner—Bertrand Zeade
(74) Attorney, Agent, or Firm—Sidley Austin Brown & Wood LLP (57) ABSTRACT

It is an object to provide an improved filter or illumination device. In order to achieve the above object, an illumination device is provided having multiple optical color filters wherein a first time period, required for at least one of the multiple optical color filters to pass across a light path, is different from a second time period, required for each of the other optical color filters to pass across the light path. According to another aspect of this invention, an illumination device has multiple optical color filters and an optical member wherein a boundary, which extends in a direction, is provided between one of the multiple optical color filters and another one of the multiple optical color filters, and the optical member includes an inlet for receiving light from the optical color filters, wherein the inlet extends in a first direction corresponding to the direction of the boundary when the boundary crosses the light path, for a greater distance than the inlet extends in a second direction.

13 Claims, 8 Drawing Sheets

FILTER, ILLUMINATION DEVICE AND ILLUMINATION METHOD

The application is based on application No. JP 11-181094 filed in Japan, the contents of which are hereby incorporated by reference.

BACKGROUND OF THE INVENTION

1. Field of the Invention

The present invention pertains to an improved filter, illumination device and illumination method, and as a specific application thereof, to a filter, illumination device and illumination method that are suitable for an optical print head used in a color printer, for example.

2. Description of the Related Art

As a solid scanning type optical recording device, a PLZT optical shutter array is known. A PLZT optical shutter array is formed of PLZT ceramic having a superior electrooptical effect, and through appropriate selection of the operating voltage, high-speed control of whether incident light passes through or is blocked by the array may be performed irrespective of the wavelength of the incident light. Moreover, because a PLZT optical shutter array can optically record information in a very small area, it may be used in an optical print head. It is especially effective in an optical print head for a color printer that uses color-photosensitive silver halide paper as the recording medium.

Figure 6:
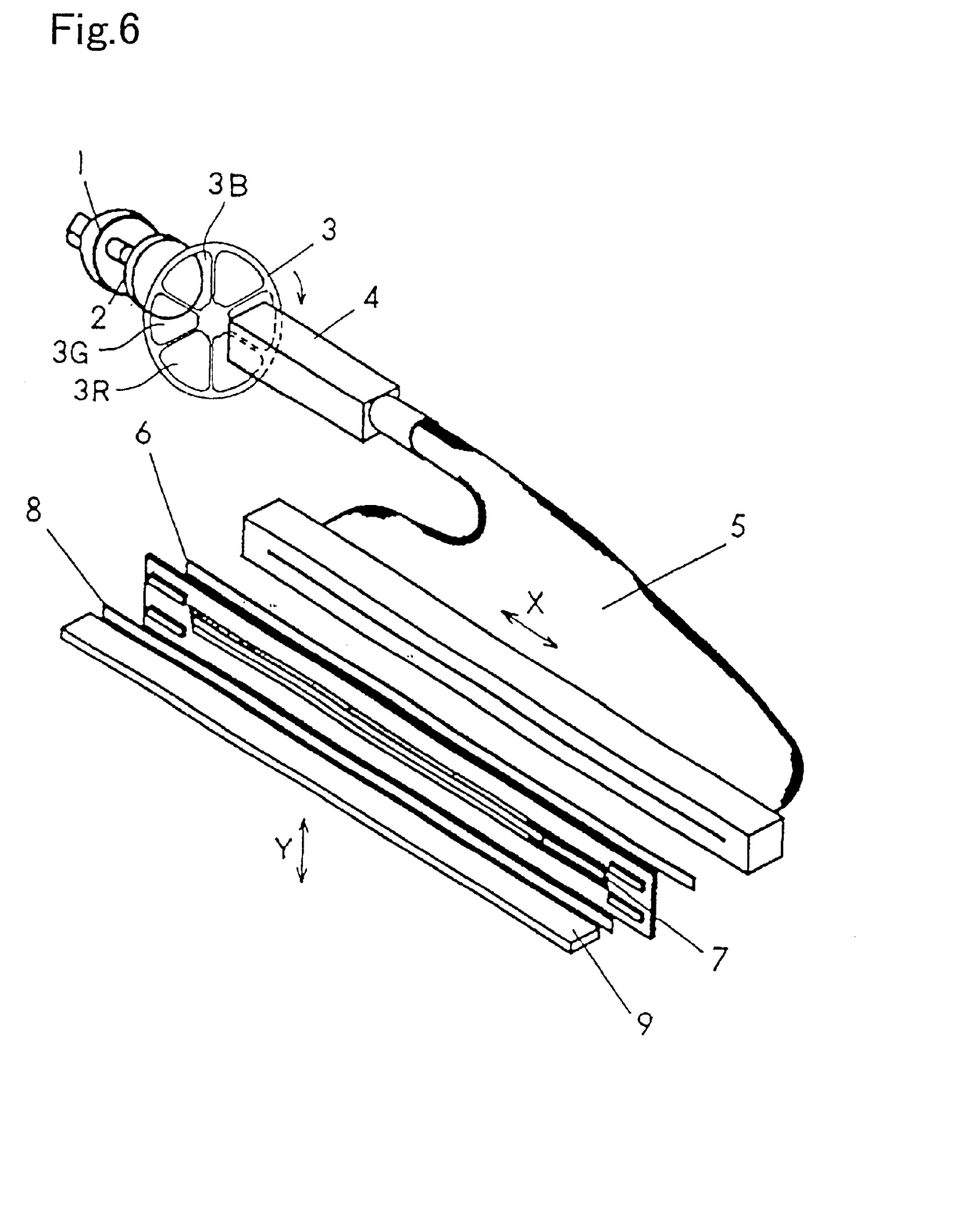
FIG. 6 is a perspective external view showing the PLZT color print head equipped with a conventional illumination device.

There are various methods employed by the color printer optical print head using this PLZT optical shutter array (hereinafter 'PLZT color print head'). In one method, a single PLZT optical shutter array is used, and the color of the incident light that strikes the PLZT optical shutter array is sequentially alternated according to a timing sequence. FIG. 6 shows the basic construction of a PLZT color print head using this method, which offers high performance.

First, the construction of the PLZT color print head shown in FIG. 6 will be explained. The PLZT color print head shown in FIG. 6 comprises a halogen lamp 1, which works as a light source, a heat filter 2, a color filter constructed as a color wheel 3, an integrator 4 that makes the intensity of the light uniform, an optical fiber light guide 5 that guides the light and converts the light leaving the light exit outlet into a linear beam, and an optical shutter unit comprising a polarizer 6, a PLZT optical shutter array 7, an analyzer 8 and a rod lens array 9. The integrator 4 is located at a position at which it can receive the light emitted from the halogen lamp 1, and the heat filter 2 and the color filter comprising light-permeable optical filters are located between the integrator 4 and the halogen lamp 1. The color filter comprises a round color wheel 3, in which color filters that respectively allow blue (B), green (G) and red (R) light to pass through are located in an area having a fan configuration that includes straight lines radiating outward from the center of the wheel and representing the radius of the circle. The light inlet 4a of the integrator 4 has a size and position that allow it to receive only light that passes through one of the multiple areas into which the color wheel 3 is divided. The light that passes through the B, G and R color filters that sequentially alternate according to a timing sequence through the rotation of the color wheel 3 strikes the integrator 4.

Figure 7:
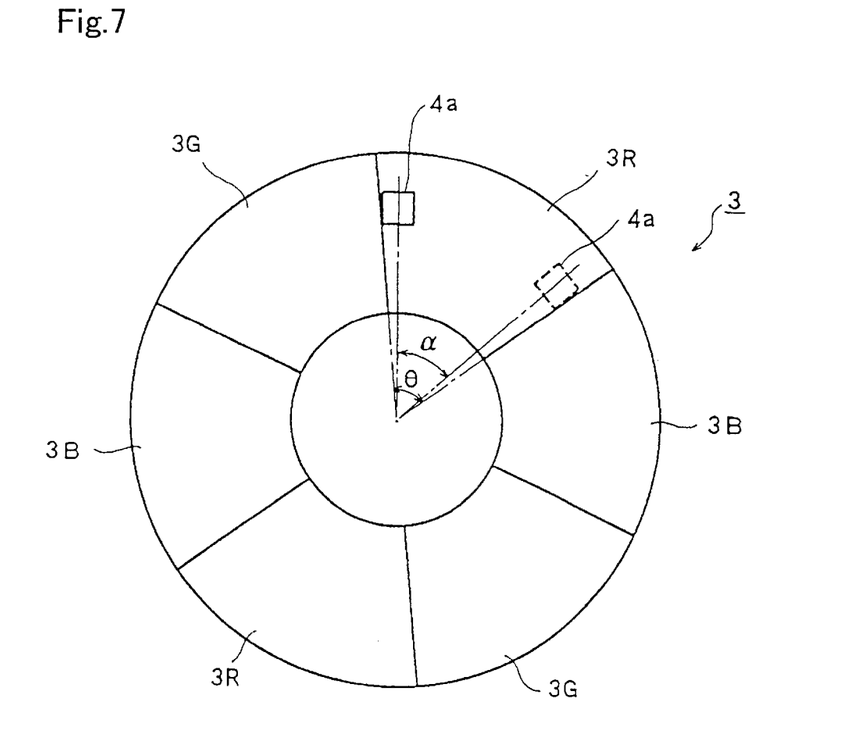
FIG. 7.is a plan view showing the color wheel of the illumination device of FIG. 6.

The operation of the PLZT color print head shown in FIG. 6 will now be explained. The white light emitted from the halogen lamp 1 comprising the light source (rated voltage= 24V, rated power=250 W) first passes through the heat filter 2. Light that is harmful to the color development of the color-photosensitive silver halide paper (i.e., UV light and infrared light) is screened out from this white light by means of this heat filter 2. The white light that passes through the heat filter 2 then passes through the color wheel 3 that rotates in one direction at a high fixed speed (12,000 rpm or higher). FIG. 7 shows the positions of the filters in the color wheel 3 as seen from the side of the heat filter 2. The color wheel 3 is divided into six segments. In the color wheel 3 are color filters 3B, 3G and 3R, which allow only blue (B), green (G) and red (R) light to pass through, respectively, and there are two filters of each type. The filters are positioned in a concyclic fashion (in other words, each filter has a fan configuration), with each filter located opposite its matching filter around the circumference of the round color wheel 3. Because the central angle θ formed by each color filter 3B, 3G and 3R is 60°, when the color wheel 3 rotates, the color filters 3B, 3G and 3R that allow the light from the halogen lamp 1 to pass through alternate in a prescribed time sequence, and as a result, light of a single color is emitted from the color wheel 3 according to an alternating time-based sequence (i.e., B→G→R→B, etc.).

The light inlet 4a of the integrator 4 is positioned relative to the center of the color wheel 3 in the manner shown by the solid lines in FIG. 7, and appears to move around the circumference of the color wheel as the color wheel rotates. (In fact, the light inlet 4a is fixed and the filter rotates, and as described above, the light striking the light inlet 4a is sequentially alternated according to a timing sequence.) The light that strikes the light inlet 4a at the time that the light inlet 4a is positioned such that it extends onto the next filter (or the component that serves as a border) cannot be used to expose the recording medium. Therefore, only the light that passes through the filter within the range of the central angle α (the range that excludes the area within the central angle θ where the color wheel is switching from one filter to another) in FIG. 7 is used as light to perform actual exposure.

The light that exits the color wheel 3 enters the integrator 4 from the square light inlet 4a, and by passing through the integrator 4, is converted to uniform illumination light. The light passing through the integrator 4 strikes the optical fiber light guide 5. This optical fiber light guide 5 comprises multiple plastic optical fibers that are bound such that together they comprise a cylindrical configuration at the light inlet end, whereas the light outlets are aligned in a linear fashion. Therefore, the light striking the optical fiber light guide 5 is converted into straight-line illumination light having a high level of brightness at the light exit outlet. The light converted into straight-line illumination light illuminates the PLZT optical shutter array 7 after passing through the polarizer 6. After being modulated by the PLZT optical shutter array 7 and passing through the analyzer 8 and rod lens array 9 (such as the SELFOC lens manufactured by Nihon Panel Glass Co., Ltd.), it reaches a recording medium not shown in the drawing, such as color-photosensitive silver halide paper.

The PLZT optical shutter array 7 has an array construction in which approximately 60 μm optical modulation elements are aligned at a 400 dpi pitch. The PLZT optical shutter array 7 selectively allows the light to pass through or be blocked on a pixel-by-pixel basis through electrical drive control in response to the color of the incident light, based on exposed image information. Therefore, the light of each color that is modulated by the PLZT optical shutter array 7 is made to strike the recording medium by the rod lens array 9 in accordance with a timing sequence, thereby exposing the recording medium. At the same time, the recording medium moves in the secondary scanning direction Y (the direction perpendicular to the shutter array line direction X) relative to the PLZT color print head. In this way, a two-dimensional color image is recorded on the recording medium.

The PLZT color print head can print images at a print speed of one inch per second. However, to make it compatible with faster printers, the print speed of the print head must be increased. In order to do this, the alternating of the exposure colors must be speeded up by increasing the speed of rotation of color wheel 3 or the number of segments. However, there are limits to the speed with which the exposure colors alternate, and from the standpoint of the need to supply light energy (i.e., an amount of light) corresponding to the spectral sensitivity of the color-photosensitive silver halide paper for that color, it is preferred that the filters be alternated with high efficiency. The reason for this will be explained with reference to FIGS. 8 and 9.

Figure 8:
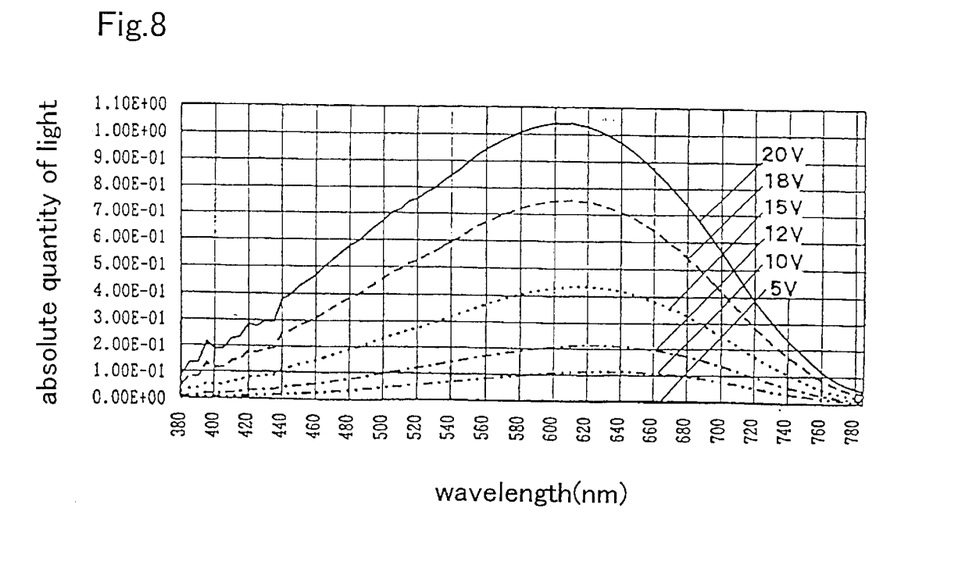
FIG. 8 is a graph showing the spectral characteristics of a halogen lamp used as a general source of light.

The graph in FIG. 8 shows the spectral characteristics of the white light after it passes through the heat filter 2. In FIG. 8, the thick solid line shows the spectral characteristic when the lamp voltage is 20V, the dashed line shows the spectral characteristic when the lamp voltage is 18V, the dotted line shows the spectral characteristic when the lamp voltage is 15V, the dashed/one dot line shows the spectral characteristic when the lamp voltage is 12V, the dashed/two dot line shows the spectral characteristic when the lamp voltage is 10V, and the fine solid line shows the spectral characteristic when the lamp voltage is 5V. In each case, the curve can be seen to be hill-shaped, with the peak being reached at around 600 nm. With regard to absolute light amount, E+00 indicates ×10°, while E−01 indicates×$10^{-1}$.

Figure 9:
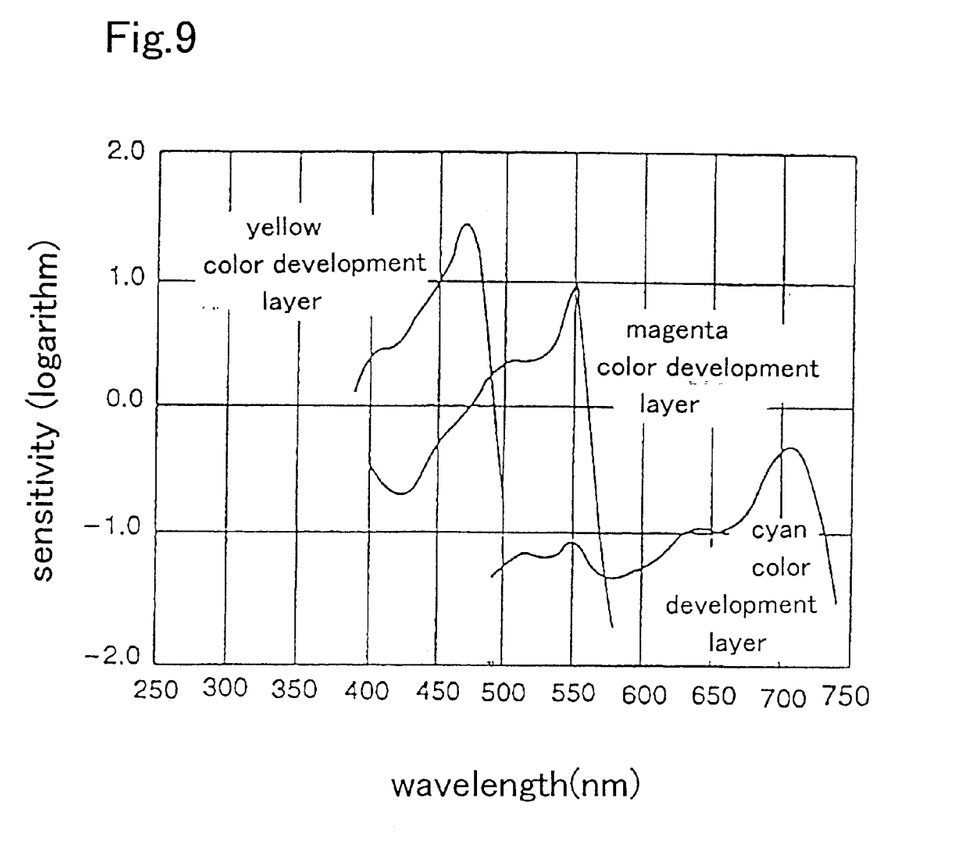
FIG. 9 is a graph showing the spectral sensitivity of general color-sensitive silver halide paper.

On the one hand, the graph in FIG. 9 shows the spectral sensitivity curve for general color-photosensitive silver halide paper. The sensitivity (logarithm) is the inverse of the exposure light amount (erg/$cm^2$) necessary to obtain a prescribed darkness. The effective exposure time is 0.5 seconds, and the developer is RA-4. It can be seen from FIG. 9 that the yellow color development layer is sensitive to the single-color light of blue (B), that the magenta color development layer is sensitive to the single color light of green (G), and that the cyan color development layer is sensitive to the single color light of red (R), and that the sensitivity of the color-sensitive silver halide paper decreases significantly in the order of B→G→R. In other words, the amount of energy needed to expose the color-photosensitive silver halide paper increases in the order of R, G, B.

On the other hand, the light emission spectrum of the light source shows only a single peak in the area of green (G) light, as seen from FIG. 8. In other words, the spectral distribution of the R component that requires a large amount of light energy to expose the recording medium is relatively weak in the light source. Therefore, it can be seen that it will not be easy to obtain sufficient light energy to ensure cyan color development (i.e., R exposure). This problem could be eliminated by increasing the power of the halogen lamp 1, but there are obviously limits to this approach. The reason for this is that increasing the power of the light source also increases the effect of the heat rays and increases power consumption.

OBJECTS AND SUMMARY

The present invention was created in consideration of the situation described above. Its object is to provide an improved filter or illumination device. In other words, its object is to provide an illumination device by which the amount of light necessary to perform exposure may be efficiently obtained from the light source. Another object is to improve the efficiency of exposure of the recording medium without increasing the amount of light emitted from the light source. More specifically, its object is to provide an illumination device to efficiently perform exposure in accordance with the spectral sensitivity of the recording medium. Another object is to provide an illumination device that reduces the amount of time that exposure of the recording medium cannot be performed due to the alternating of filters.

In order to obtain these and other objects, the illumination device of one aspect of the present invention is an illumination device comprising a light source, multiple color filters with different light permeability or reflectance characteristics located in a continuous fashion, a drive mechanism constructed such that the multiple color filters that either reflect the light from the light source or allow it to pass through are sequentially alternated based on a timing sequence, and a lighting member that takes in from the light inlet the light that passes through or is reflected from the color filters and guides it in a prescribed direction, wherein the time required for the light passing through or being reflected from at least one of the multiple color filters to be taken in by the lighting member is different from the time required for light passing through or being reflected from the other color filters.

The light illumination device of another aspect of the present invention is an illumination device comprising a light source, a rotatable round color wheel that has multiple color filters aligned around the circumference of the color wheel that have different light permeability or reflectance characteristics, wherein when the color wheel rotates, the color filters that either reflect the light from the light source or allow it to pass through sequentially alternate according to a timing sequence, a drive mechanism that drives the color wheel to rotate, and a lighting member that takes in from the light inlet the light that passes through or is reflected from the color filters and guides it in a prescribed direction, wherein at least one of the multiple color filters has a central angle extending to the circumference that is different from that for the other filters.

The light illumination device of yet another aspect of the present invention is an illumination device comprising a light source, multiple color filters that have different light permeability or reflectance characteristics and are positioned in a continuous fashion, a drive mechanism constructed such that the multiple color filters that either reflect the light from the light source or allow it to pass through sequentially alternate according to a timing sequence, a lighting member that takes in from the light inlet the light that passes through or is reflected from the color filters and guides it in a prescribed direction, wherein the light inlet has a configuration that extends in the directions parallel to the border between the multiple color filters.

The light illumination device of yet another aspect of the present invention is an illumination device comprising a light source, a rotatable round color wheel that has multiple color filters aligned around the circumference of the color wheel that have different light permeability or reflectance characteristics, wherein when the color wheel rotates, the color filters that either reflect the light from the light source or allow it to pass through sequentially alternate according to a timing sequence, a drive mechanism that drives the color wheel to rotate, and a lighting member that takes in from the light inlet the light that passes through or is reflected from the color filters and guides it in a prescribed direction, wherein the light inlet extends in the directions of the radius of rotation of the color wheel.

In yet another aspect of the present invention, the filter comprises multiple color filters that have different light permeability or reflectance characteristics and are located in a continuous fashion, wherein the area of at least one of the multiple color filters is different from the areas of the other color filters.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawings.

DETAILED DESCRIPTION OF THE PREFERRED EMBODIMENTS

The illumination device comprising embodiments of each aspect of the present invention will be explained with reference to the drawings. The same symbols are used to describe identical or equivalent parts among the conventional example described above (FIGS. 6 through 9) and the embodiments, and redundant explanation will be omitted where appropriate.

Figure 1:
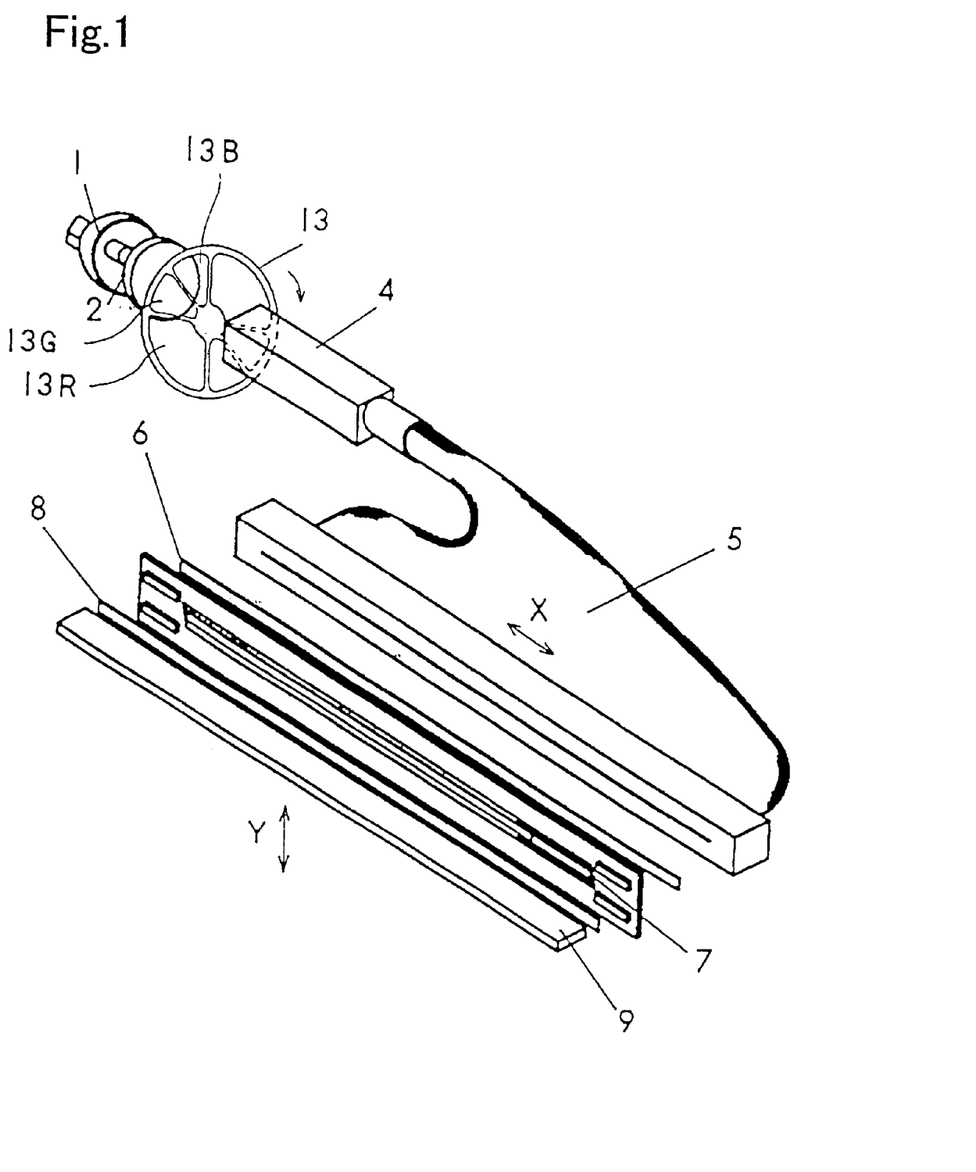
FIG. 1 is a perspective external view showing the PLZT color print head equipped with a first embodiment of the present invention.
Figure 2:
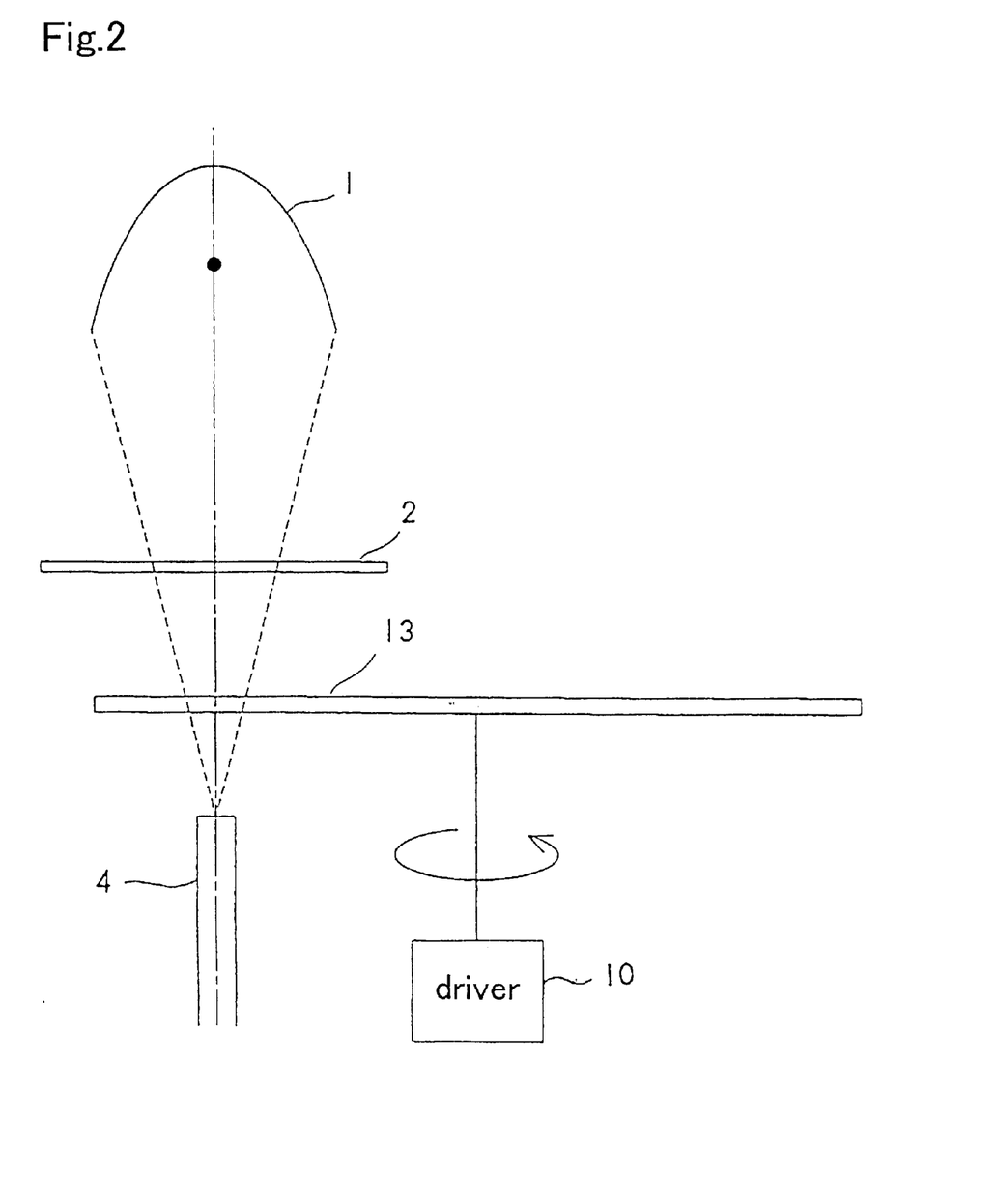
FIG. 2 is a cross-section showing in a simplified fashion the basic construction of the important components of the first embodiment.
Figure 3:
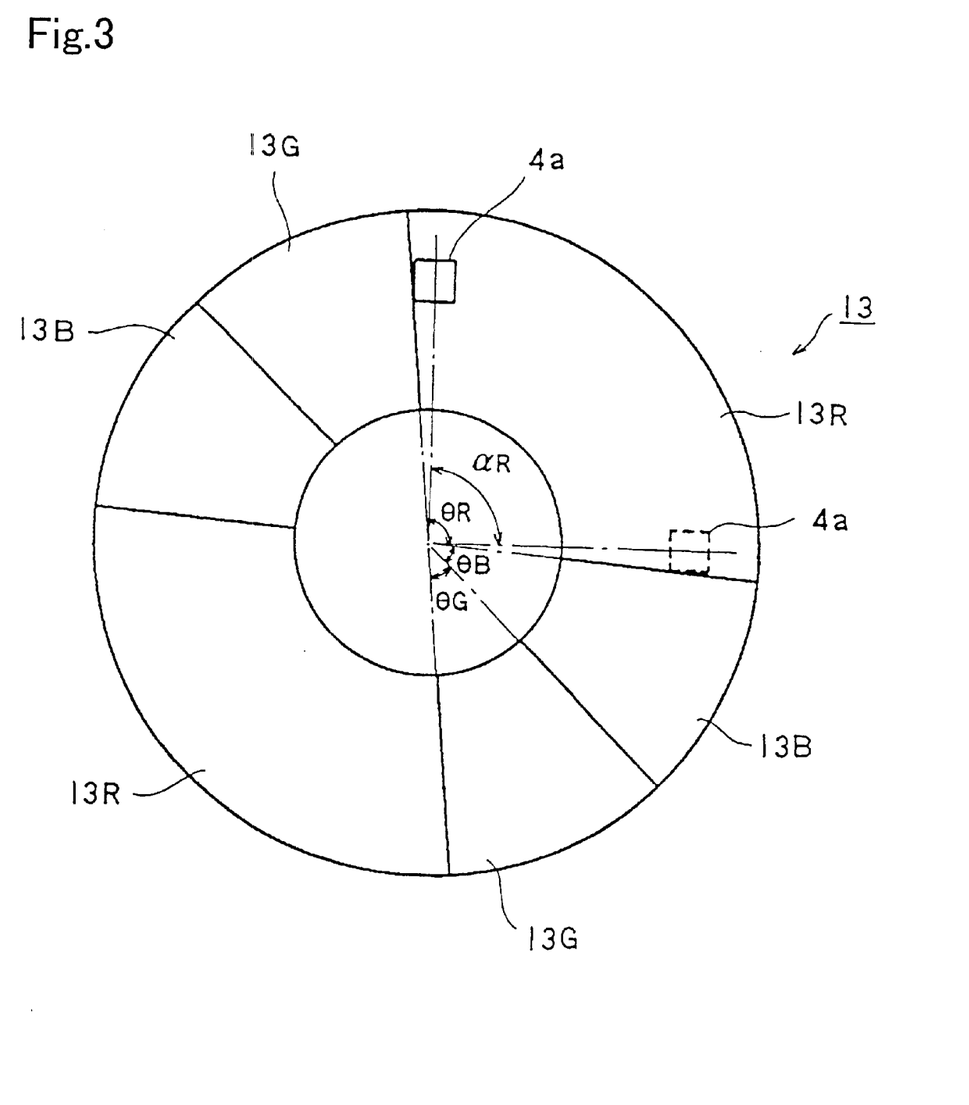
FIG. 3 is a plan view showing the color wheel of the first embodiment.

First Embodiment (FIGS. 1 Through 3)

FIG. 2 shows a cross-section of the basic construction of the important components of a first embodiment of the present invention. The first embodiment is an illumination device comprising a halogen lamp 1, a heat filter 2, a color wheel 13, an integrator 4 and a drive mechanism 10. The external appearance of the PLZT color print head equipped with this illumination device is shown in FIG. 1. In addition to the illumination device shown in FIG. 2, this print head is also equipped with an optical fiber light guide 5, a polarizer 6, a PLZT optical shutter array 7, an analyzer 8 and a rod lens array 9. As seen from FIG. 1, the main characteristic of the first embodiment is the color wheel 13, and it is identical to the conventional example (see FIGS. 6 and 7) in all other key respects.

The operation of the PLZT color print head equipped with the illumination device comprising the first embodiment will first be explained. The white light emitted from the halogen lamp 1 (rated voltage=24V, rated power=250 W) comprising a light source first passes through the heat filter 2. Light harmful to the color development of the color-sensitive silver halide paper (ultraviolet light, infrared light) is screened out from the white light by the heat filter 2. The spectral characteristics of the white light after it passes through the heat filter 2 are as shown in FIG. 8 explained above. The white light passing through the heat filter 2 passes through the color wheel 13 rotating in one direction at a high fixed speed of 12,000 rpm or higher. The color wheel 13 is made to rotate by means of a drive mechanism 10 (see FIG. 2) comprising a motor, etc.

FIG. 3 shows the arrangement of the filters in the color wheel 13, as seen from the side of the heat filter 2. The color wheel 13 is divided into six fan-shaped segments, i.e., two segments each of 13B, 13G and 13R, which allow light of a single color, i.e., blue (B), green (G) and red (R), to pass through, respectively, such that two identical color filters face each across the center of the wheel. Because the six color filters 13B, 13G and 13R are positioned in a concyclic fashion, when the color wheel 13 rotates, the color filters 13B, 13G and 13R that allow the light from the halogen lamp 1 to pass through sequentially alternate according to a timing sequence, and as a result, light of a single color that is sequentially alternated according to a timing sequence (i.e., B→G→R→B, etc.) exits the color wheel 13.

The light that exits the color wheel 13 enters the integrator 4 from the light inlet 4a having a square configuration (see FIG. 3), and is converted into uniform illumination light by passing through the integrator 4. The light that passes through the integrator 4 comprising a lighting member strikes the optical fiber light guide 5. This optical fiber light guide 5 comprises multiple plastic optical fibers that are bound such that they together form a cylindrical configuration at the light inlet end and such that the light outlets are aligned in a linear fashion. Therefore, the light striking the optical fiber light guide 5 is converted into straight-line illumination light having a high level of brightness at the light exit outlet. The light converted into straight-line illumination light illuminates the PLZT optical shutter array 7 after passing through the polarizer 6. After being modulated by the PLZT optical shutter array 7 and passing through the analyzer 8 and rod lens array 9 (such as the SELFOC lens manufactured by Nihon Panel Glass Co., Ltd.), it reaches a recording medium not shown in the drawing, such as color-photosensitive silver halide paper.

The PLZT optical shutter array 7 has an array construction in which approximately 60 $\mu$m optical modulation elements are aligned at a 400 dpi pitch. The PLZT optical shutter array 7 selectively blocks or allows the light to pass through on a pixel-by-pixel basis through electrical drive control in response to the color of the incident light, based on exposed image information. Therefore, the light of each color that is modulated by the PLZT optical shutter array 7 is made to strike the recording medium by the rod lens array 9 in accordance with a timing sequence, thereby exposing the recording medium. At the same time, the recording medium moves in the secondary scanning direction Y (the direction perpendicular to the shutter array line direction X) relative to the PLZT color print head. In this way, a two-dimensional color image is recorded on the recording medium. (The print speed is one inch per second or higher.)

The color wheel 13 comprising the main characteristic of the first embodiment will now be explained. In the color wheel 13, the central angle (i.e., the fan-shaped central angle) θR formed by the color filter 13R is different from the central angles θB and θG formed by the color filters 13B and 13G, respectively. Specifically, the central angle θR formed by one color filter 13R is 100°, while the central angles θB and θG are each 40°. Therefore, while the sum of the central angles θR, θG and θB for one RGB group comprising three color filters is 180°, as in the case of the color wheel 3 (see FIG. 7), the central angle θR is larger than the other central angles θB and θG, making the filters arranged in an unbalanced fashion. Because the light passing through the areas where the light is switching from one color to another is not used for actual exposure, only the area defined by central angle αR within central angle θR may be used for exposure (the same is true for central angles θB and θG).

Because the color wheel 13 rotates at a fixed speed, if only the central angle θR is increased, the time over which light strikes the color filter 13R is longer than the time over which light strikes the color filters 13B or 13G. As a result, the time over which the single-color light R strikes the PLZT optical shutter array 7 is longer than the time over which the other single-color lights B or G strike the optical shutter array 7 (in addition, the time for driving of the PLZT shutter array 7 must also be increased to that extent). Therefore, the time over which the recording medium is exposed by the single-color light R is longer than the time over which it is exposed by the other single-color lights B and G, which allows the recording medium to be exposed by light energy (i.e., an amount of light) sufficient to carry out cyan color development (i.e., exposure by single-color light R), which requires a higher light amount than is required for single-color lights B or G.

Specifically, from the relationship between the central angle θR, which is 100°, and central angles θB and θG, which are each 40°, it can been seen that the exposure time for the single-color light R is 5/2 of the exposure time for the single-color lights B or G. When compared with the color wheel 3 (see FIG. 7) rotating at the same speed, from the relationship between the 100° central angle θR in the color wheel 13 and the 60° central angle θ in the color wheel 3, it can be seen that the exposure time for the single-color light R in the color wheel 13 is 5/3 of the exposure time for the single-color light R in the color wheel 3.

As explained above, by using a color wheel 13 in which the central angles θB, θG and θR formed by the fan-shaped segments are not uniform, light amounts necessary for exposure may be efficiently obtained for each exposure color in accordance with the spectral sensitivity of the recording medium. As a result, the desired image darkness characteristic may be obtained without increasing the power of the light source. Moreover, the increase in exposure percentage is not limited only to single-color light R, and the central angles θ for B and G may also be changed in accordance with the spectral sensitivity of the recording medium, permitting a construction in which the central angles θB, θG and θR are all different. In other words, by setting the central angles θ for each of the color filters to be approximately inversely proportional to the relative spectral sensitivities of the recording medium to light energy of each of the single colors, a highly efficient exposure device may be obtained. Moreover, in this embodiment, the color wheel 13 contained two groups of B, G and R filters, but the invention is not limited to this implementation, and may comprise one group or three groups as well.

Furthermore, in this embodiment, light that passed through the color filters 13B, 13G and 13R was used as the single-color light B, G and R to illuminate the PLZT optical shutter array 7, but color filters that reflect light of these single color lights B, G and R may also be used, and the reflected light from these color filters may be used to illuminate the PLZT optical shutter array 7. In other words, a construction may be adopted in which multiple color filters having different reflectance characteristics are arranged in a concyclic fashion, and the color wheel is mounted in a rotatable fashion such that the reflective color filters sequentially alternate in accordance with a timing sequence.

Moreover, the means by which the filters are alternated is not limited to the rotation of a color wheel. For example, a construction in which the filters are alternated through the back and forth movement of filters aligned in a linear fashion, or a construction in which filters are aligned in a belt-like configuration and alternate through the rotation of a roller may also be applied. In this case, the areas of each color filter and the resulting time of exposure for each color should be made non-uniform based on the reasoning discussed above.

Figure 4:
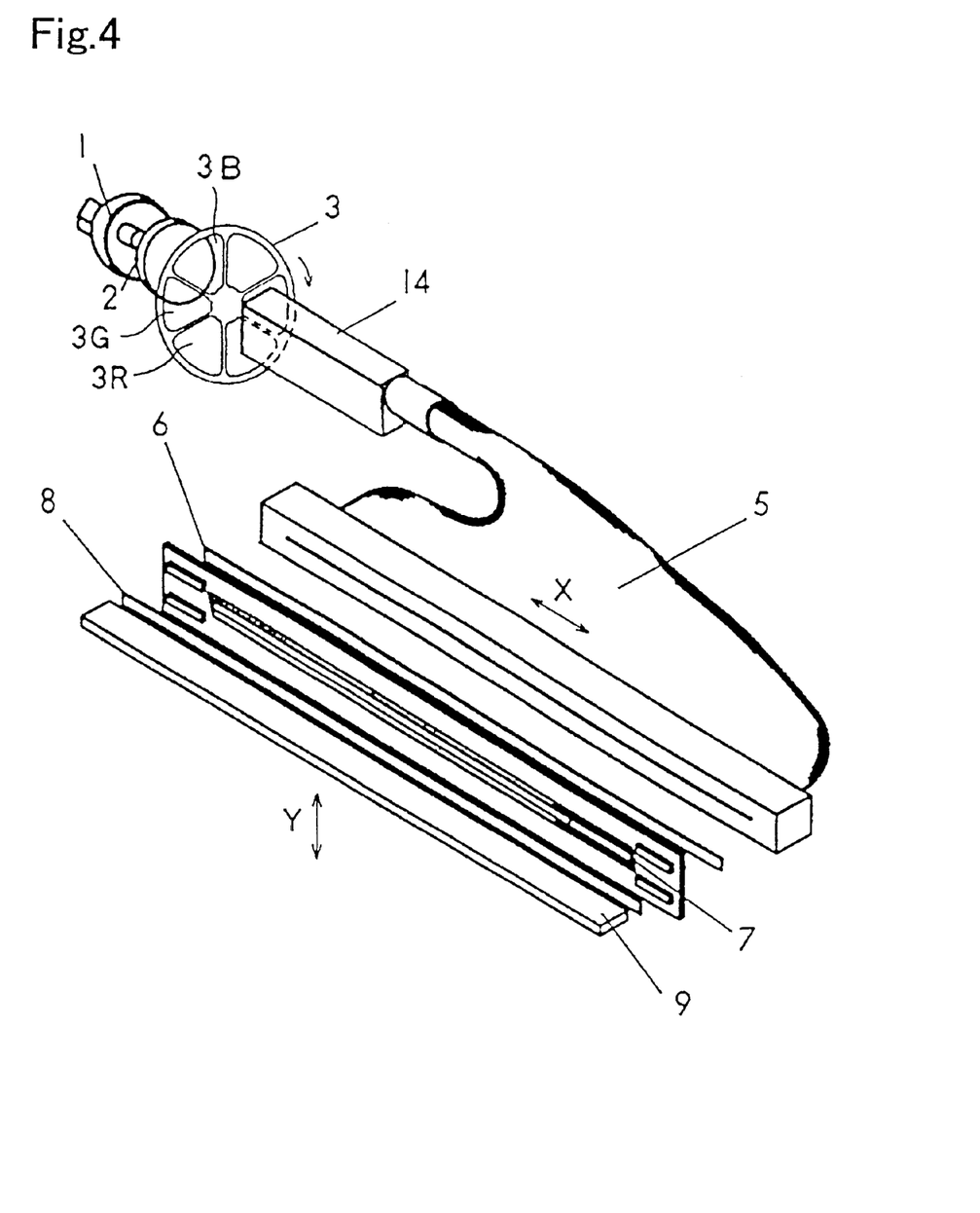
FIG. 4 is a perspective external view showing the PLZT color print head equipped with a second embodiment of the present invention.
Figure 5:
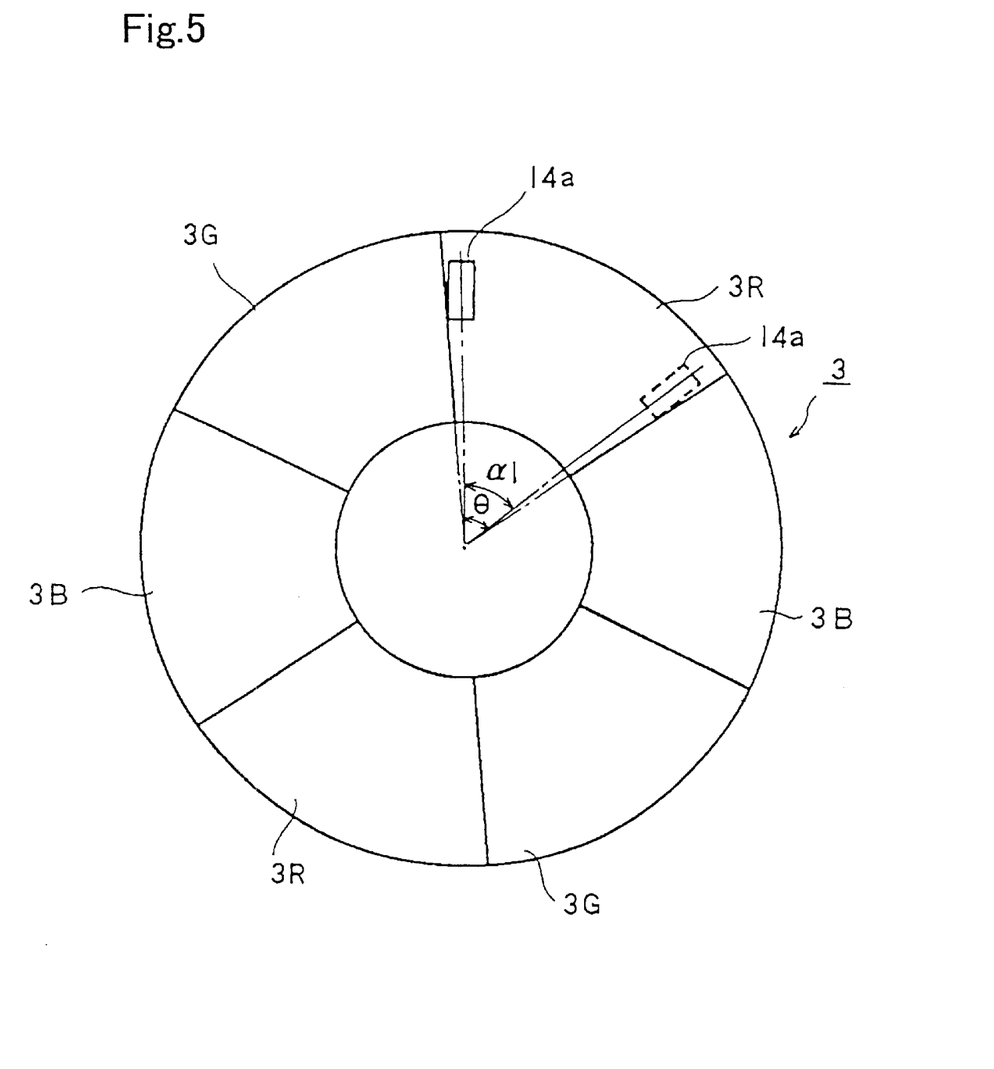
FIG. 5 is a plan view showing the color wheel of the second embodiment.

Second Embodiment (FIGS. 4 and 5)

FIG. 4 shows the external appearance of the PLZT color print head in which a second embodiment of the present invention is applied. FIG. 5 shows the arrangement of the filters in the color wheel 3 as seen from the side of the heat filter 2. The main characteristic of the second embodiment is the integrator 14, and the other basic components are identical to those in the conventional example (see FIGS. 6 and 7). Normally, the light inlet that takes in the light that passes through or is reflected from the color filters has a square configuration, as in the case of the light inlet 4a of the integrator 4 (see FIGS. 3 and 7), or a round configuration. Here, however, the light inlet 14a of the integrator 14 used as a lighting member in this embodiment has a rectangular configuration extending in the directions of the radius of rotation of the color wheel 3 (see FIG. 5).

Because exposure control is performed by the PLZT optical shutter array 7 for light of each of the single colors B, G and R, the light passing through the areas where the light is switching from one color to another is not used for actual exposure. For example, in the case of the conventional example (see FIG. 7), exposure cannot be performed when the center of the light inlet 4a is positioned within the range θ–α a comprising the difference between central angle θ and central angle α(in other words, when the light inlet 4a extends over two adjacent color filters). Consequently, the light passing through the exposure light switching range θ–α is wasted, and the effective time during which exposure may be performed is reduced by some 30%.

In comparison with the conventional example (see FIG. 7), the integrator 14 used in this embodiment (see FIG. 5) has a rectangular configuration extending in the directions of the radius of rotation of the color wheel 3, and is shorter in the direction of rotation to that extent. As a result, the switching area between exposure colors can be made smaller without reducing the light receiving area of the light inlet 14a (α<α1). By making the exposure color switching area smaller, the effective time over which the recording medium is exposed by light of the single exposure colors R, G and B is increased (in addition, the time for driving of the PLZT optical shutter array 7 must also be increased to that extent). Therefore, the light amount necessary for exposure may be efficiently obtained from the light source, and the desired image darkness characteristic may be obtained without increasing the power of the light source. Furthermore, the light inlet 14a has a rectangular configuration in this embodiment, but a different configuration that increases the central angle α 1 (e.g., any configuration extending in the directions of the radius of rotation of the color wheel 3, including an oblong configuration, a fan configuration, a trapezoidal configuration, or a triangular configuration) may be used instead, so long as it does not reduce the light receiving area of the light inlet 14*a*.

Moreover, the means by which the filters are alternated is not limited to the rotation of a color wheel. For example, a construction in which the filters are alternated through the back and forth movement of filters aligned in a linear fashion, or a construction in which filters are aligned in a belt-like configuration and alternate through the rotation of a roller may also be applied. In this case, the configuration of the light inlet 14*a* should be extended in the directions parallel to the border between the color filters and shortened in the directions perpendicular to said border without reducing the light receiving area.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. An illumination device comprising:

a light source for emitting light;

an optical member for receiving the light emitted from the light source;

a rotatable wheel having multiple optical color filters which are arranged between said light source and said optical member, the rotatable wheel having at least two filters evenly positioned about the the center of the rotatable wheel for each color of filter on the rotatable wheel, and a drive mechanism for driving said rotatable wheel such that the multiple optical color filters sequentially pass across a light path from said light source to said optical member;

wherein each respective one of the optical color filters affects the light emitted by said light source while the respective one optical color filter passes across the light path, and a first time period, required for at least one of the multiple optical color filters to pass across the light path, is different from a second time period, required for each respective one of the other optical color filters to pass across the light path.

2. An illumination device as claimed in claim 1, wherein said multiple optical color filters respectively allow blue (B), green(G) and red(R) light to pass through or be reflected.

3. An illumination device as claimed in claim 1, wherein an area of said at least one of the multiple optical color filters is different from an area of each respective one of the other optical color filters.

4. An illumination device as claimed in claim 1, wherein said drive mechanism drives said wheel to rotate.

5. An illumination device as claimed in claim 1, wherein said multiple optical color filters are sequentially arranged on said wheel in a rotational direction of the wheel, and each of said multiple optical color filters has a fan configuration.

6. An illumination device as claimed in claim 5, wherein at least one of the multiple optical color filters has a central angle extending in the rotational direction that is different from that of each respective one of the other optical color filters having a color different than the color of the at least one of the multiple optical color filters.

7. An illumination device as claimed in claim 1, wherein a boundary is provided between one of said multiple optical color filters and another one of said multiple optical color filters, said boundary extending in a direction, and said optical member includes an inlet for receiving light from said optical color filters, wherein said inlet extends in a first direction, corresponding to the direction of said boundary when the boundary crosses the light path, for a greater distance than said inlet extends in a second direction, corresponding to a direction of movement of said multiple optical color filters across the light path.

8. An illumination device comprising:

a light source for emitting light;

an optical member for receiving the light emitted from the light source;

a rotatable wheel having multiple optical color filters which are arranged between said light source and said optical member, the rotatable wheel having at least two filters evenly positioned about the the center of the rotatable wheel for each color of filter on the rotatable wheel, and a drive mechanism for driving said rotatable wheel such that the multiple optical color filters sequentially pass across a light path from said light source to said optical member;

wherein each respective one of the optical color filters affects the light emitted by said light source while the respective one optical color filter passes across the light path, and a boundary is provided between one of said multiple optical color filters and another one of said multiple optical color filters, said boundary extending in a direction, and said optical member includes an inlet for receiving light from said optical color filters, wherein said inlet extends in a first direction, corresponding to the direction of said boundary when the boundary crosses the light path, for a greater distance than said inlet extends in a second direction.

9. An illumination device as claimed in claim 8, wherein said multiple optical color filters respectively allow blue (B), green(G) and red(R) light to pass through or be reflected.

10. An illumination device as claimed in claim 8, wherein said drive mechanism drives said wheel to rotate.

11. An illumination device as claimed in claim 8, wherein said multiple optical color filters are sequentially arranged on said wheel in a rotational direction of the wheel, and each respective one of said multiple optical color filters has a fan configuration.

12. An illumination device as claimed in claim 11, wherein said boundary extends in a direction of a radius of rotation of said color wheel.

13. An illumination device as claimed in claim 11, wherein said second direction is in the rotational direction of the wheel.

* * * * *